United States Patent
Guen et al.

(10) Patent No.: US 9,768,436 B2
(45) Date of Patent: Sep. 19, 2017

(54) RECHARGEABLE BATTERY HAVING TOP INSULATING MEMBER

(71) Applicant: Samsung SDI Co., Ltd., Yongin-si, Gyeonggi-do (KR)

(72) Inventors: Min-Hyung Guen, Yongin-si (KR); Chi-Young Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/559,860

(22) Filed: Dec. 3, 2014

(65) Prior Publication Data
US 2015/0280203 A1 Oct. 1, 2015

(30) Foreign Application Priority Data
Mar. 31, 2014 (KR) .................. 10-2014-0038015

(51) Int. Cl.
*H01M 2/34* (2006.01)
*H01M 2/04* (2006.01)
(Continued)

(52) U.S. Cl.
CPC ......... *H01M 2/345* (2013.01); *H01M 2/0473* (2013.01); *H01M 2/30* (2013.01); *H01M 2/1241* (2013.01); *H01M 2200/20* (2013.01)

(58) Field of Classification Search
None
See application file for complete search history.

(56) References Cited

U.S. PATENT DOCUMENTS

| 9,012,050 B2 * | 4/2015 | Byun ............... H01M 2/024 429/56 |
| 2006/0019531 A1 * | 1/2006 | Moon ............... H01M 2/0473 439/501 |

(Continued)

FOREIGN PATENT DOCUMENTS

| EP | 1 926 160 A1 | 5/2008 |
| EP | 2 500 959 A1 | 9/2012 |
| EP | 2 860 796 A2 | 4/2015 |

OTHER PUBLICATIONS

EPO Office Action dated Jan. 31, 2017, for corresponding European Patent Application No. 15161693.5 (7 pages).

(Continued)

*Primary Examiner* — Patrick Ryan
*Assistant Examiner* — Christopher Domone
(74) *Attorney, Agent, or Firm* — Lewis Roca Rothgerber Christie LLP

(57) ABSTRACT

A rechargeable battery includes a case accommodating an electrode assembly; a cap plate coupled to the case and having a short-circuit hole; a first electrode terminal and a second electrode terminal extending through the cap plate and electrically connected to the electrode assembly; a membrane fixed to the cap plate in the short-circuit hole and configured to electrically connect the first electrode terminal and the second electrode terminal to cause a short circuit; a connection plate electrically connected to the first electrode terminal and spaced from a side of a short-circuit member; a top insulating member located between the connection plate and the cap plate; and a fixing member fixed to the cap plate and supporting the top insulating member.

17 Claims, 11 Drawing Sheets

(51) Int. Cl.
*H01M 2/30* (2006.01)
*H01M 2/12* (2006.01)

(56) References Cited

U.S. PATENT DOCUMENTS

| | | | | |
|---|---|---|---|---|
| 2008/0118825 A1* | 5/2008 | Yoon | .................. | H01M 2/0404 |
| | | | | 429/122 |
| 2010/0323234 A1 | 12/2010 | Kim et al. | | |
| 2011/0171505 A1* | 7/2011 | Kishll | .................. | H01M 2/1016 |
| | | | | 429/82 |
| 2012/0129017 A1* | 5/2012 | Ota | .................... | H01M 2/0404 |
| | | | | 429/7 |
| 2012/0261206 A1* | 10/2012 | Yasui | ................. | B60L 11/1877 |
| | | | | 180/274 |
| 2013/0330581 A1 | 12/2013 | Kim et al. | | |

OTHER PUBLICATIONS

EPO Search Report dated Jul. 6, 2015, for corresponding European Patent application 15161693.5, (11 pages).

* cited by examiner

RECHARGEABLE BATTERY HAVING TOP INSULATING MEMBER

CROSS-REFERENCE TO RELATED APPLICATION

This application claims priority to and the benefit of Korean Patent Application No. 10-2014-0038015 filed in the Korean Intellectual Property Office on Mar. 31, 2014, the entire contents of which are incorporated herein by reference.

BACKGROUND

1. Field

The present disclosure relates to a rechargeable battery.

2. Description of the Related Art

Typically, a rechargeable battery is repeatedly charged and discharged, unlike a primary battery. A low capacity rechargeable battery is used in a small electronic portable device such as a mobile phone, a laptop computer, and a camcorder. A large capacity rechargeable battery may be used as a power source for motor driving in a hybrid vehicle.

The rechargeable battery includes an electrode assembly where a positive electrode and a negative electrode are formed on respective surfaces of a separator, a case receiving the electrode assembly, a cap plate sealing an opening of the case, and a negative electrode terminal and a positive electrode terminal provided through the cap plate to be electrically connected to the electrode assembly.

A top insulating member electrically connecting the terminal and the cap plate is provided under the terminal. The top insulating member is formed to be wider than the terminal which may cause a longitudinal end of the top insulating member to be separated from the cap plate, particularly when the top insulating member is longitudinally formed in one direction. In this case, foreign substances such as liquids problematically permeate through a gap between the top insulating member and the cap plate.

Further, when gas is generated in the rechargeable battery, the internal pressure of the case is increased. When charging and discharging are repeated in a high pressure state, there is a risk of ignition or explosion of the rechargeable battery.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery in which a top insulating member is able to maintain close contact with a cap plate. Further, the present invention has been made in an effort to provide a rechargeable battery in which permeation of foreign substances and moisture from the outside is prevented or significantly reduced.

An exemplary embodiment provides a rechargeable battery including a case receiving an electrode assembly. A cap plate is fastened to an opening of the case and has a short-circuit hole formed therethrough. A first electrode terminal and a second electrode terminal are provided through the cap plate to be electrically connected to the electrode assembly. A membrane is fixed to the cap plate in the short-circuit hole and electrically separates or short-circuits the first electrode terminal and the second electrode terminal outside the electrode assembly. A connection plate is electrically connected to the first electrode terminal and spaced from a side of a short-circuit member. A top insulating member is located between the connection plate and the cap plate. A fixing member is fixed to the cap plate and provided through the top insulating member to support the top insulating member.

Herein, the fixing member may include a protrusion protruding from the cap plate. The fixing member may include a column unit and a head unit having a transverse cross-section that is larger than a transverse cross-section of the column unit.

Further, a thread groove may be formed in the cap plate and the fixing member may be screwed to the thread groove. The fixing member may be fixed to the cap plate by welding.

Further, a protruding support flange may be formed at an end of a longitudinal side of the top insulating member, and the fixing member may be provided through the support flange. The top insulating member may include a bottom plate coming into contact with the cap plate, an upper plate spaced from the bottom plate and facing the bottom plate, and a side wall connecting the bottom plate and the upper plate.

The connection plate may be inserted into the top insulating member and the top insulating member may be formed by insert injection. A tube-shaped cylinder unit protruding toward the membrane may be formed in an internal side of the connection plate. An internal insulating member having an internal outlet may be provided to be inserted into the cylinder unit. A stopper may be fitted into the internal insulating member.

Further, the connection plate may include a plate unit connected to the first electrode terminal. The cylinder unit may protrude from the plate unit toward the membrane and may be located in the short-circuit hole to be spaced from an internal surface of the short-circuit hole. The internal insulating member may include a first insertion unit coming into close contact with an internal surface of the cylinder unit to open an upper side, and a first barrier spaced from an internal side of the first insertion unit in a diameter direction of the first insertion unit to form a receiving groove between the first barrier and the first insertion unit.

Further, the stopper may include a second barrier inserted into an opening side of the first insertion unit and thus inserted into the receiving groove, and a cover connected to a side of the second barrier to cover the first insertion unit.

Further, the first barrier may be plurally formed to form a plurality of receiving grooves in the first insertion unit. The second barrier may be plurally formed to be fastened to the receiving grooves. Further, a first interval may be formed between an end of the first barrier and an internal surface of the cover. A second interval may be formed between an end of the second barrier and a bottom surface of the receiving groove.

Further, the first barrier and the second barrier may be loosely fastened at one of sides thereof and a third interval may be formed at other sides thereof. The top insulating member may include an upper outlet formed on at least one side of the cover to be connected to the third interval.

Further, the first insertion unit and the first barrier may be formed in a concentric cylindrical form. The first insertion unit and the second barrier may be formed in a concentric cylindrical form.

According to the exemplary embodiment, since a fixing member supports a top insulating member, it is possible to prevent the top insulating member from being spaced from a cap plate.

Further, according to the exemplary embodiment, since a stopper is fastened to an outlet of the top insulating member fastened to a through-hole of a connection plate to provide an external short-circuit unit, it is possible to prevent external foreign substances and moisture from permeating into a gap between the connection plate and a membrane and emit internal pressure when the membrane is reversely deformed.

DETAILED DESCRIPTION

Figure 1:
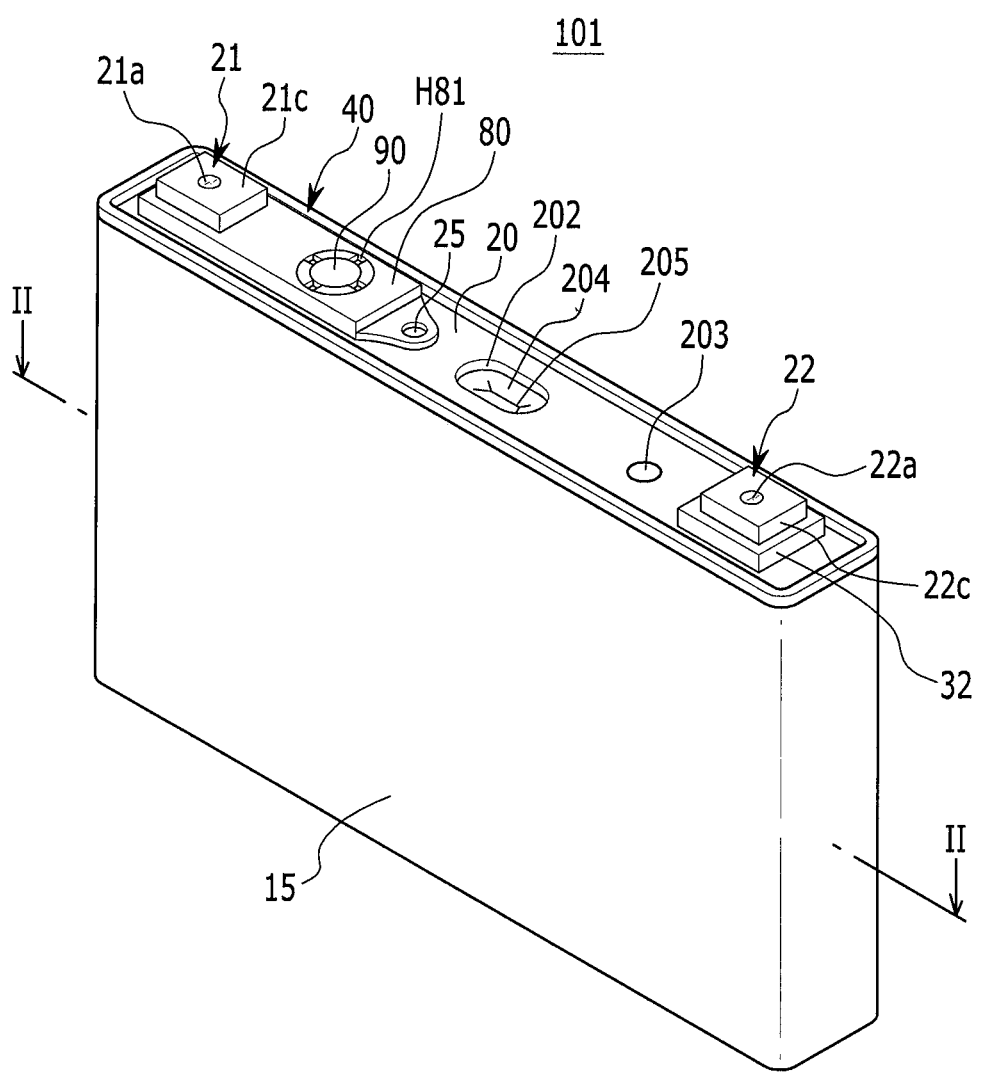
FIG. 1 is a perspective view of a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
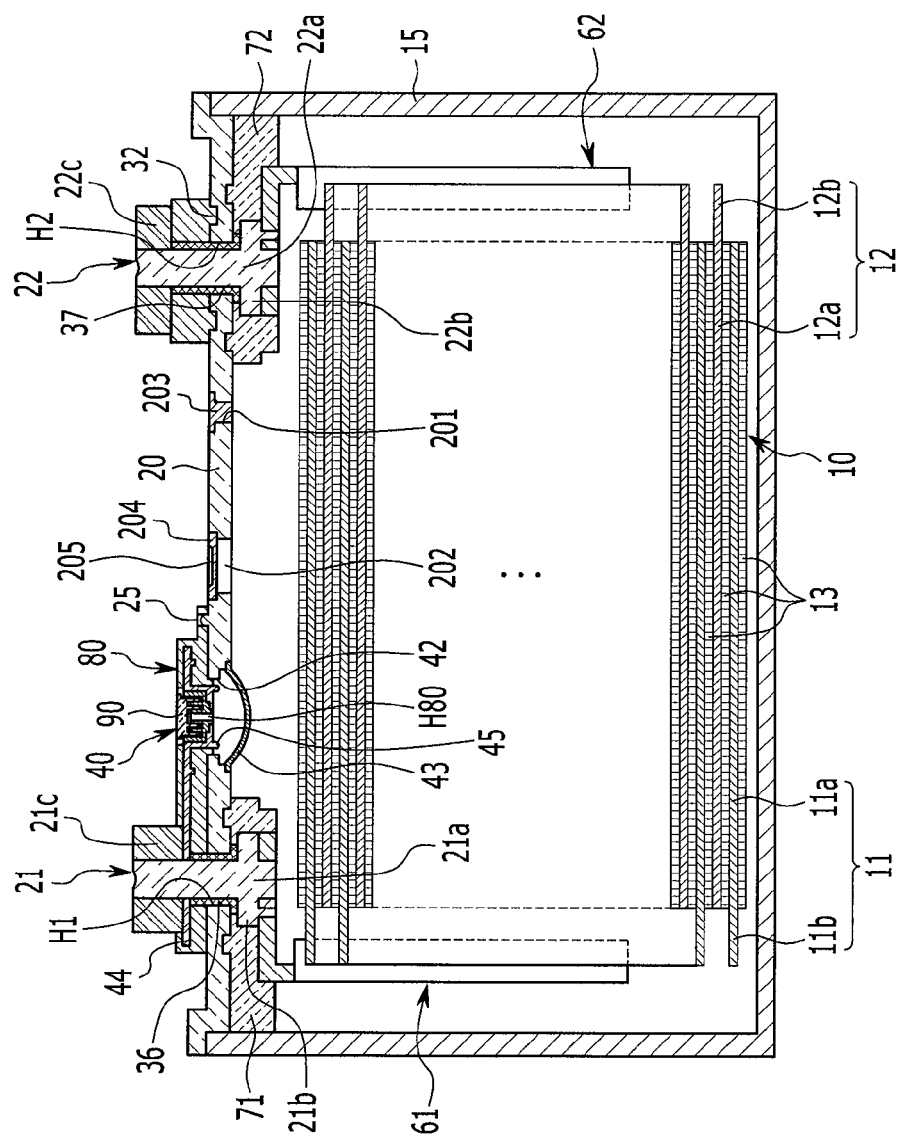
FIG. 2 is a cross-sectional view taken along the line II-II of FIG. 1.

FIG. 1 is a perspective view of a rechargeable battery according to a first exemplary embodiment of the present invention, and FIG. 2 is a cross-sectional view taken along the line II-II of FIG. 1. Referring to FIGS. 1 and 2, a rechargeable battery 101 according to the first exemplary embodiment includes an electrode assembly 10, a case 15 accommodating the electrode assembly 10, a cap plate 20 sealing an opening of the case 15, a first electrode terminal 21 and a second electrode terminal 22 provided in terminal holes H1 and H2 of the cap plate 20 to be connected to the electrode assembly 10, and a membrane 43 electrically separating or connecting the cap plate 20 and the first electrode terminal 21.

The cap plate 20 is electrically connected to the second electrode terminal 22. For convenience, the first electrode terminal 21 is set as a negative electrode terminal and the second electrode terminal 22 is set as a positive electrode terminal. The electrode assembly 10 is formed by disposing a negative electrode 11 and a positive electrode 12 on opposite sides of a separator 13 as an insulator, and winding the negative electrode 11, the separator 13, and the positive electrode 12 in a jelly roll state.

The negative and positive electrodes 11 and 12 includes coated regions 11a and 12a in which an active material is applied on a current collector formed of a metal plate, and uncoated regions 11b and 12b formed of the current collector which is not coated with the active material but exposed.

The uncoated region 11b of the negative electrode 11 is formed at an end of the wound negative electrode 11. The uncoated region 12b of the positive electrode 12 is formed at an end of the wound positive electrode 12. Accordingly, the uncoated regions 11b and 12b of the negative and positive electrodes 11 and 12 are located at opposite ends of the electrode assembly 10.

The case 15 is formed of an approximate cuboid to provide a space to accommodate the electrode assembly 10 and an electrolyte therein, and the opening through which external and internal spaces communicate is formed in a surface of the cuboid. The electrode assembly 10 may be inserted through the opening into the case 15.

The cap plate 20 is formed of a thin plate and is welded to the opening of the case 15 to seal the case 15. The cap plate 20 further includes an electrolyte injection opening 201, a vent hole 202, and a short-circuit hole 42.

The electrolyte is capable of being injected through the electrolyte injection opening 201 into the case 15 after the cap plate 20 is fastened to the case 15 and welded. After the electrolyte is injected, the electrolyte injection opening 201 is sealed by a sealing stopper 203.

The vent hole 202 is sealed by a vent plate 204 to emit the internal pressure of the rechargeable battery. When the internal pressure of the rechargeable battery reaches a predetermined pressure, the vent plate 204 is fractured to open the vent hole 202. A notch 205 for inducing cutting is formed in the vent plate 204.

In one embodiment, the negative and positive electrode terminals 21 and 22 are provided in the terminal holes H1 and H2 formed through the cap plate 20 to be electrically connected to the electrode assembly 10. In other words, the first electrode terminal 21 is electrically connected to the negative electrode 11 of the electrode assembly 10, and the second electrode terminal 22 is electrically connected to the positive electrode 12 of the electrode assembly 10. Accordingly, the electrode assembly 10 is drawn through the first electrode terminal 21 and the second electrode terminal 22 to the outside of the case 15.

The negative and positive electrode terminals 21 and 22 include rivet terminals 21a and 22a provided in the terminal holes H1 and H2 of the cap plate 20, flanges 21b and 22b integrally and widely formed with the rivet terminals 21a and 22a in the cap plate 20, and plate terminals 21c and 22c located on an external side of the cap plate 20 to be connected to the rivet terminals 21a and 22a by riveting or welding.

Negative and positive electrode gaskets 36 and 37 are inserted between the rivet terminals 21a and 22a of the negative and positive electrode terminals 21 and 22 and internal surfaces of the terminal holes H1 and H2 of the cap plate 20, respectively, to seal a space between the rivet terminals 21a and 22a of the negative and positive electrode terminals 21 and 22 and the cap plate 20. The negative and positive electrode gaskets 36 and 37 further extend between the flanges 21b and 22b and an internal surface of the cap plate 20 to further seal a space between the flanges 21b and 22b and the cap plate 20.

Negative and positive electrode lead tabs 61 and 62 electrically connect the negative and positive electrode terminals 21 and 22 to the uncoated regions 11b and 12b of the negative and positive electrodes 11 and 12 of the electrode assembly 10, respectively. In other words, the negative and positive electrode lead tabs 61 and 62 are fastened to lower ends of the rivet terminals 21a and 22a, and the lower ends are caulked to connect the negative and positive electrode lead tabs 61 and 62 to the lower ends of the rivet terminals 21a and 22a in a conductive structure while the negative and positive electrode lead tabs 61 and 62 are supported by the flanges 21b and 22b.

Negative and positive electrode bottom insulating members 71 and 72 are provided between the negative and positive electrode lead tabs 61 and 62 and the cap plate 20 to electrically insulate the negative and positive electrode lead tabs 61 and 62 and the cap plate 20. Further, the negative and positive electrode bottom insulating members 71 and 72 are fastened to the cap plate 20 at a side thereof and surround the negative and positive electrode lead tabs 61 and 62, the rivet terminals 21a and 22a, and the flanges 21b and 22b at another side thereof, thus stabilizing a connection structure thereof.

In one embodiment, the second electrode terminal 22 further includes a top plate 32 located between the plate terminal 22c and the cap plate 20. The positive electrode gasket 37 further extends to be inserted between the rivet terminal 22a of the second electrode terminal 22 and the top plate 32, thus preventing the rivet terminal 22a and the top plate 32 from being directly electrically connected. In other words, the rivet terminal 22a is electrically connected through the plate terminal 22c to the top plate 32. Accordingly, the top plate 32, the cap plate 20, and the case 15 are electrically connected to the second electrode terminal 22 to be electrified by the positive electrode.

Figure 3:
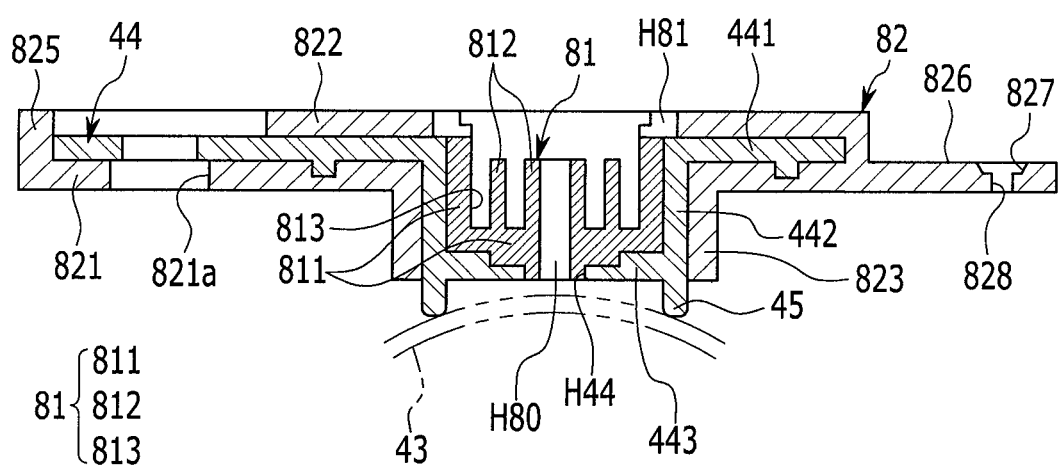
FIG. 3 is a longitudinal cross-sectional view showing a connection plate and a top insulating member.
Figure 4:
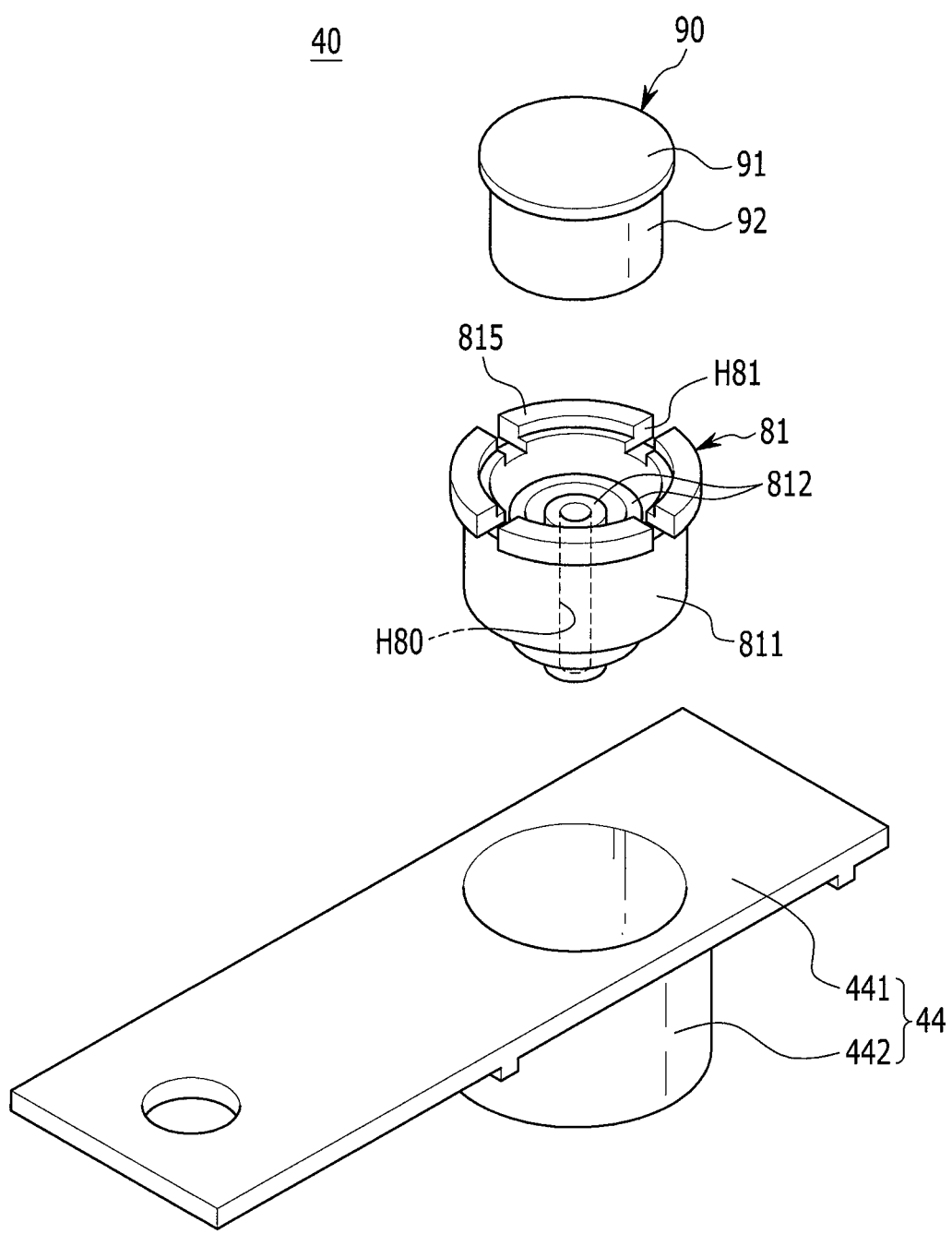
FIG. 4 is an exploded perspective view of the connection plate, an internal insulating member, and a stopper of FIG. 2.
Figure 5:
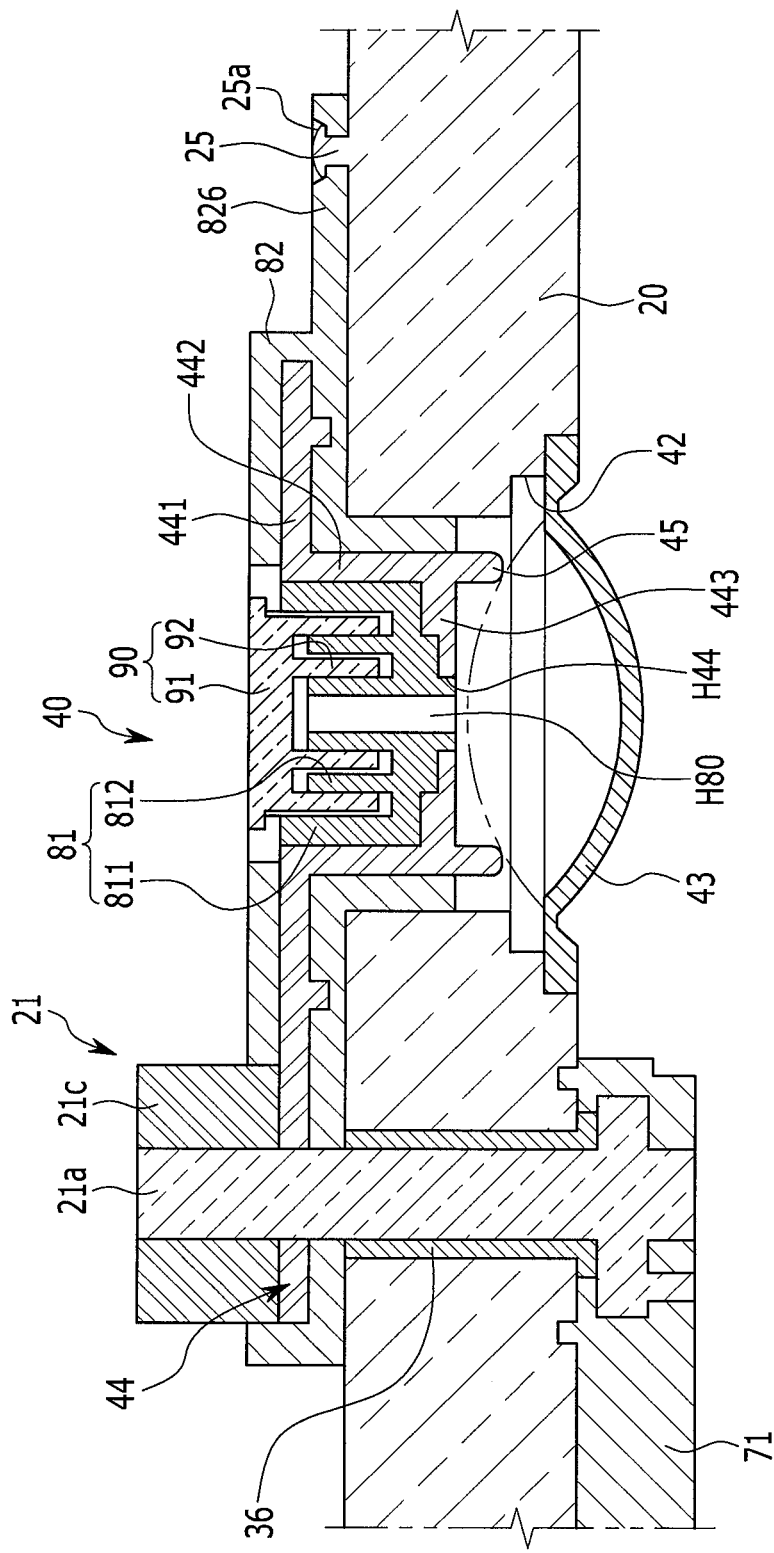
FIG. 5 is a partial cross-sectional view of the rechargeable battery according to the first exemplary embodiment of the present invention.

FIG. 3 is a longitudinal cross-sectional view showing a connection plate and a top insulating member, FIG. 4 is an exploded perspective view of the connection plate, an internal insulating member, and a stopper of FIG. 2, and FIG. 5 is a partial cross-sectional view of the rechargeable battery according to the first exemplary embodiment of the present invention.

Referring to FIGS. 3 to 5, the membrane 43 sealing the short-circuit hole 42 and reversely deformed according to the internal pressure is provided to the short-circuit hole 42 formed through the cap plate 20. The membrane 43 has a plate shape and is provided to be downwardly convex, i.e., generally curved toward the electrode assembly. When the internal pressure of the rechargeable battery is increased, a portion which is downwardly convex is deformed to be upwardly convex and thus be electrically connected to a connection plate 44. The membrane 43 is electrified by the positive electrode via the cap plate 20, and the connection plate 44 is electrically connected to the first electrode terminal 21 to be electrified by the negative electrode 11. Accordingly, when the membrane 43 is reversely deformed to come into contact with the connection plate 44, an external short-circuit occurs.

The connection plate 44 is provided to be connected to the first electrode terminal 21, electrically connected to the first electrode terminal 21 and spaced from a side of the membrane 43. When the membrane 43 is reversely deformed due to an increase in internal pressure, a short-circuit protrusion 45 of the connection plate 44 formed at a facing side of the membrane 43 short-circuits the membrane 43 and the connection plate 44.

The connection plate 44 includes a plate unit 441 coming into contact with a bottom surface of the first electrode terminal 21 to be connected to the first electrode terminal 21, and a cylinder unit 442 protruding from the plate unit 441 toward the membrane 43 and located in the short-circuit hole 42 to be spaced from an internal surface of the short-circuit hole 42. A bottom 443 crossing the cylinder unit 442 is formed at a lower portion of the cylinder unit 442, and a through-hole H44 is formed through the bottom 443.

In one embodiment, an internal insulating member 81 is provided to be inserted into the cylinder unit 442. The internal insulating member 81 allows the internal pressure to be emitted and also allows a stopper 90 blocking permeation of external foreign substances and moisture to be fastened when the membrane 43 is reversely deformed. The stopper 90 is fitted into the internal insulating member 81. The stopper 90 allows the internal pressure to be emitted when the membrane 43 is reversely deformed, and normally prevents foreign substances from flowing through a first ventilation hole 284 to an outlet.

In one embodiment, a top insulating member 82 is provided between the connection plate 44 and the cap plate 20. The top insulating member 82 electrically insulates the cap plate 20 electrified by the positive electrode and the connection plate 44 connected to the rivet terminal 21a of the first electrode terminal 21 on the cap plate 20.

The internal insulating member 81 includes a first insertion unit 811 inserted into the cylinder unit 442 and a first barrier 812 provided in the first insertion unit 811. The first insertion unit 811 is formed to have a structure where the first insertion unit 811 comes into close contact with the through-hole H44, the bottom 443, and an internal surface of the cylinder unit 442, and an upper side thereof is opened. The first barrier 812 is spaced from an internal side of the first insertion unit 811 in a diameter direction of the first insertion unit 811 to form a receiving groove 813 between the first barrier 812 and the first insertion unit 811. Further, an internal outlet H80 is formed at the center of the internal insulating member 81, and an upper outlet H81 is formed on an upper end of the internal insulating member 81. The internal outlet H80 is surrounded by the first barrier and formed through the center of the internal insulating member 81. The upper outlet H81 is formed as a groove type on the upper end of the internal insulating member 81, and a plurality of upper outlets are formed to be spaced from each other.

The stopper 90 includes a cover 91 covering a second barrier 92 and the first insertion unit 811 to correspond to the internal insulating member 81 and be fastened to the internal insulating member 81. The second barrier 92 is inserted into an opening side of the first insertion unit 811 and is thus inserted into the receiving groove 813 of the internal insulating member 81. The cover 91 is connected to a side of the second barrier 92 to cover the first insertion unit 811.

For example, multiple first barriers 812 of the internal insulating member 81 may be provided to form a plurality of receiving grooves 813 in the first insertion unit 811. Correspondingly, multiple second barriers 92 of the corresponding stopper 90 may be provided to be fastened to respective receiving grooves 813.

In one embodiment, the stopper 90 prevents external foreign substances and moisture from permeating into the internal insulating member 81, and allows the internal pressure to be emitted through the internal outlet H80 of the internal insulating member 81 when the membrane 43 is reversely deformed.

The first insertion unit 811 and the first barrier 812 are formed in a concentric cylindrical form in the internal insulating member 81. Further, the first insertion unit 811 and the second barrier 92 are formed in a concentric cylindrical form. Accordingly, the second barrier 92 of the stopper 90 may be fastened to the receiving groove 813 of the internal insulating member 81.

Figure 6:
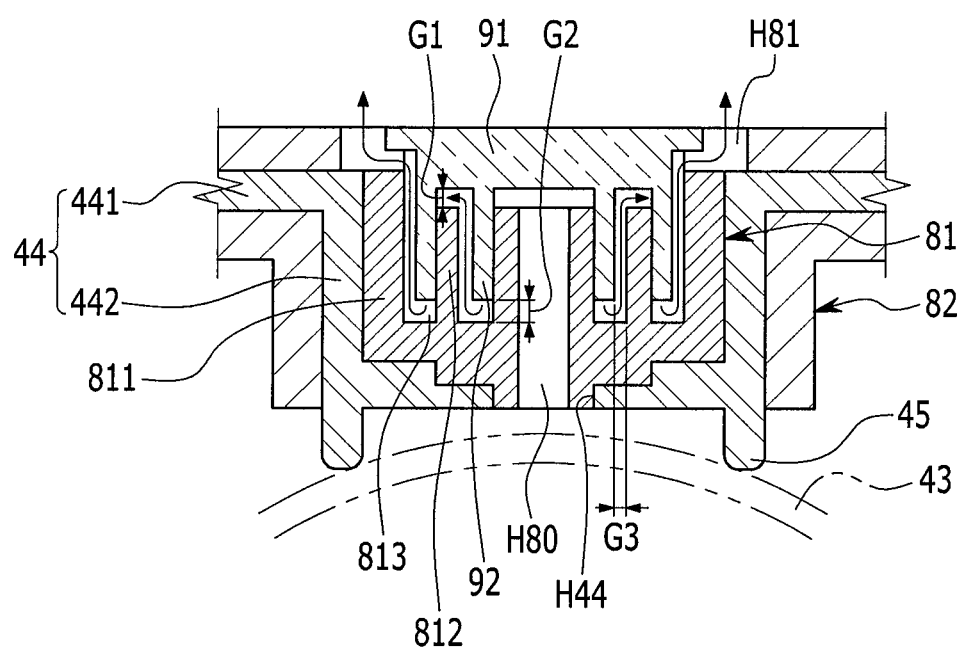
FIG. 6 is an operation state view of the internal insulating member and the stopper.

FIG. 6 is an operation state view of an external short-circuit unit. Referring to FIGS. 5 and 6, in the internal insulating member 81, a first interval G1 is formed between an end of the first barrier 812 and an internal surface of the cover 91. In the stopper 90, a second interval G2 is formed between an end of the second barrier 92 and a bottom surface of the receiving groove 813.

When the stopper 90 is fastened to the internal insulating member 81, since the first barrier 812 and the second barrier 92 are loosely fastened with a fastening tolerance, the internal pressure may be emitted between the first barrier 812 and the second barrier 92 when the membrane 43 is reversely deformed.

A flange unit 815 (FIG. 4) extending to the outside is formed on the upper end of the internal insulating member 81. The upper outlet H81 connected to a third interval G3 is formed in the flange unit 815. The upper outlet H81 is formed to have a cut structure in the flange unit 815, and a plurality of upper outlets are formed on the upper end of the internal insulating member 81 spaced at equal intervals.

Since the fastening tolerance is connected to the first interval G1 and the second interval G2, the internal outlet H80 of the internal insulating member 81 is connected so that the internal pressure is emitted through the upper outlet H81 to the outside.

In addition, the first barrier 812 and the second barrier 92 may be loosely fastened at one side thereof, and the third interval G3 may be formed at the other side thereof. Since the third interval G3 and the fastening tolerance are connected to the first interval G1 and the second interval G2, the internal outlet H80 of the internal insulating member 81 is further connected so that the internal pressure is emitted through the upper outlet H81 to the outside.

When the membrane 43 is reversely deformed due to an increase in internal pressure of the rechargeable battery to be short-circuited to the short-circuit protrusion 45 of the connection plate 44, a current charged in the electrode assembly 10 is discharged through the membrane 43 and the connection plate 44.

The internal pressure is emitted due to reverse deformation of the membrane 43 through the internal outlet H80 of the internal insulating member 81 via the first interval G1, the third interval G3, the second interval G2, and the third interval G3 in consecutive order to the upper outlet H81.

Further, the first barrier 812 and the second barrier 92 are plurally formed, and thus the receiving groove 813 is plurally formed. Accordingly, a path between the internal outlet H80 and the upper outlet H81 becomes long. In other words, the first barrier 812 of the internal insulating member 81 and the second carrier 92 of the stopper 90 lengthens an emission path of the internal pressure and an inflow path of foreign substances and moisture. Accordingly, an external short-circuit unit 40 may allow the internal pressure to be easily emitted and effectively prevent foreign substances and moisture from permeating.

For example, the stopper 90 may be formed of a polypropylene (PP) resin, a polycarbonate (PC) resin, a polycarbosilane (PCS) precursor, or a polycarbonate-ABS (PC-ABS; PC-acrylonitrile butadiene styrene) mixture resin.

Figure 7:
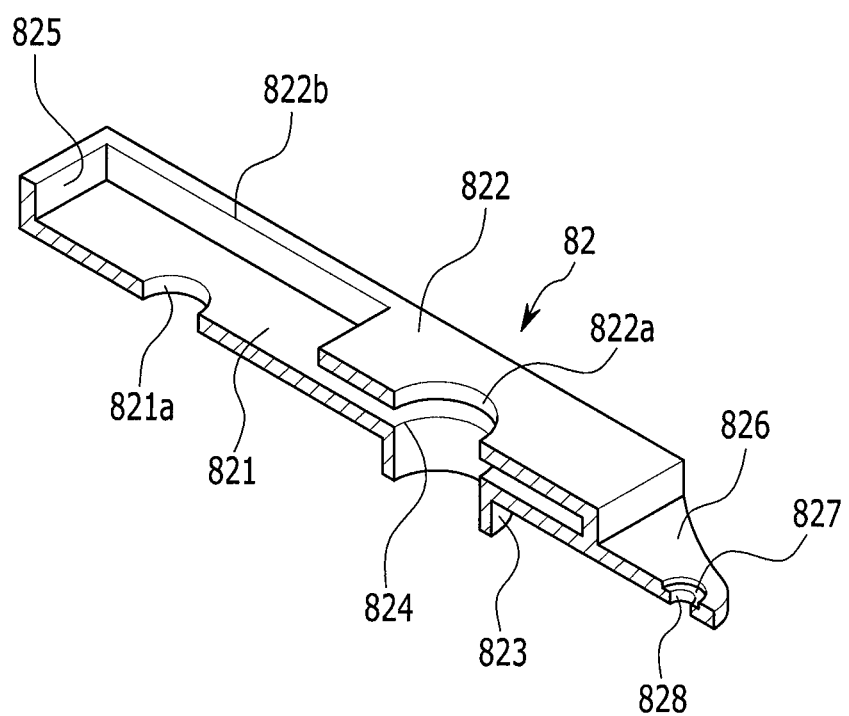
FIG. 7 is a cut perspective view of the top insulating member according to the first exemplary embodiment of the present invention.

As shown in FIG. 7, the top insulating member 82 includes a bottom plate 821 coming into contact with the cap plate 20, an upper plate 822 spaced from the bottom plate 821, and a side wall 825 connecting the bottom plate 821 and the upper plate 822.

The bottom plate 821 has a rectangular plate shape and contacts the cap plate 20. A terminal hole 821a into which the rivet terminal 21a is inserted and a first ventilation hole 824 located on the short-circuit hole 42 to communicate with the short-circuit hole 42 are formed in the bottom plate 821. Further, a guide rib 823 protruding downwardly to be inserted into the short-circuit hole 42 is formed at a circumference of the first ventilation hole 824.

The upper plate 822 is spaced from and faces the bottom plate 821. The connection plate 44 is inserted between the bottom plate 821 and the upper plate 822. An opening 822b into which the plate terminal 21c is inserted is formed in the upper plate 822. The opening 822b is positioned at an upper portion of the terminal hole 821a. Further, a second ventilation hole 822a, into which the internal insulating member 81 and the stopper 90 are inserted and communicating with the first ventilation hole 824 is formed in the upper plate 822.

The side wall 825 is formed to extend along the circumference of the bottom plate 821, and protrudes upwardly from the bottom plate 821 to connect the bottom plate 821 and the upper plate 822. In one embodiment, a support flange 826 is formed at an end of a longitudinal side of the bottom plate 821, and a fixing hole 828 through which a fixing member 25 is provided is formed in the support flange 826.

As shown in FIG. 5, the fixing member 25 is formed to protrude over the cap plate and is formed as a rivet type. The fixing member 25 is integrally formed with the cap plate, and includes the protrusion protruding from the cap plate.

Referring also to FIG. 7, the fixing member 25 is pressed while being inserted into the fixing hole 828 to be fixed in the fixing hole 828. A widely expanded head unit 25a is formed on an upper end of the fixing member 25. A laterally expanded step groove 827 is formed at an upper portion of the fixing hole 828. The head unit 25a is inserted into the step groove 827. When the upper end of the fixing member 25 is tapped or pressed while the fixing member 25 is inserted into the fixing hole 828, the widely expanded head unit 25a is formed on the upper end of the fixing member 25. The head unit 25a prevents the support flange 826 from being separated from the cap plate 20.

As described above, according to the present exemplary embodiment, the fixing member 25 is provided through the top insulating member 82 to support the top insulating member 82. Therefore, even if the length of the top insulating member 82 is increased, the top insulating member 82 may be prevented from being spaced or separated from the cap plate 20.

Figure 8:
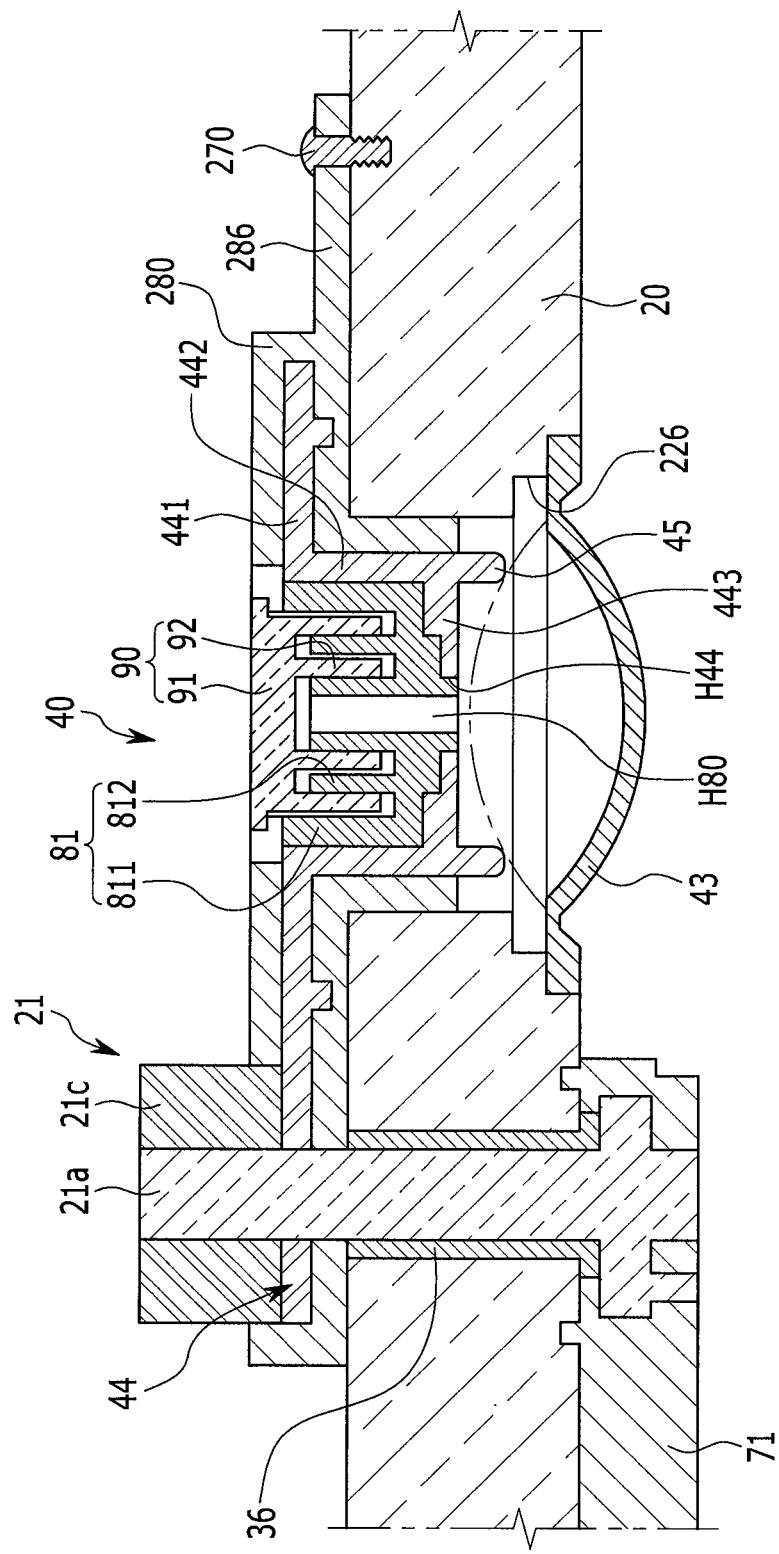
FIG. 8 is a cross-sectional view showing a portion of a rechargeable battery according to a second exemplary embodiment of the present invention.
Figure 9:
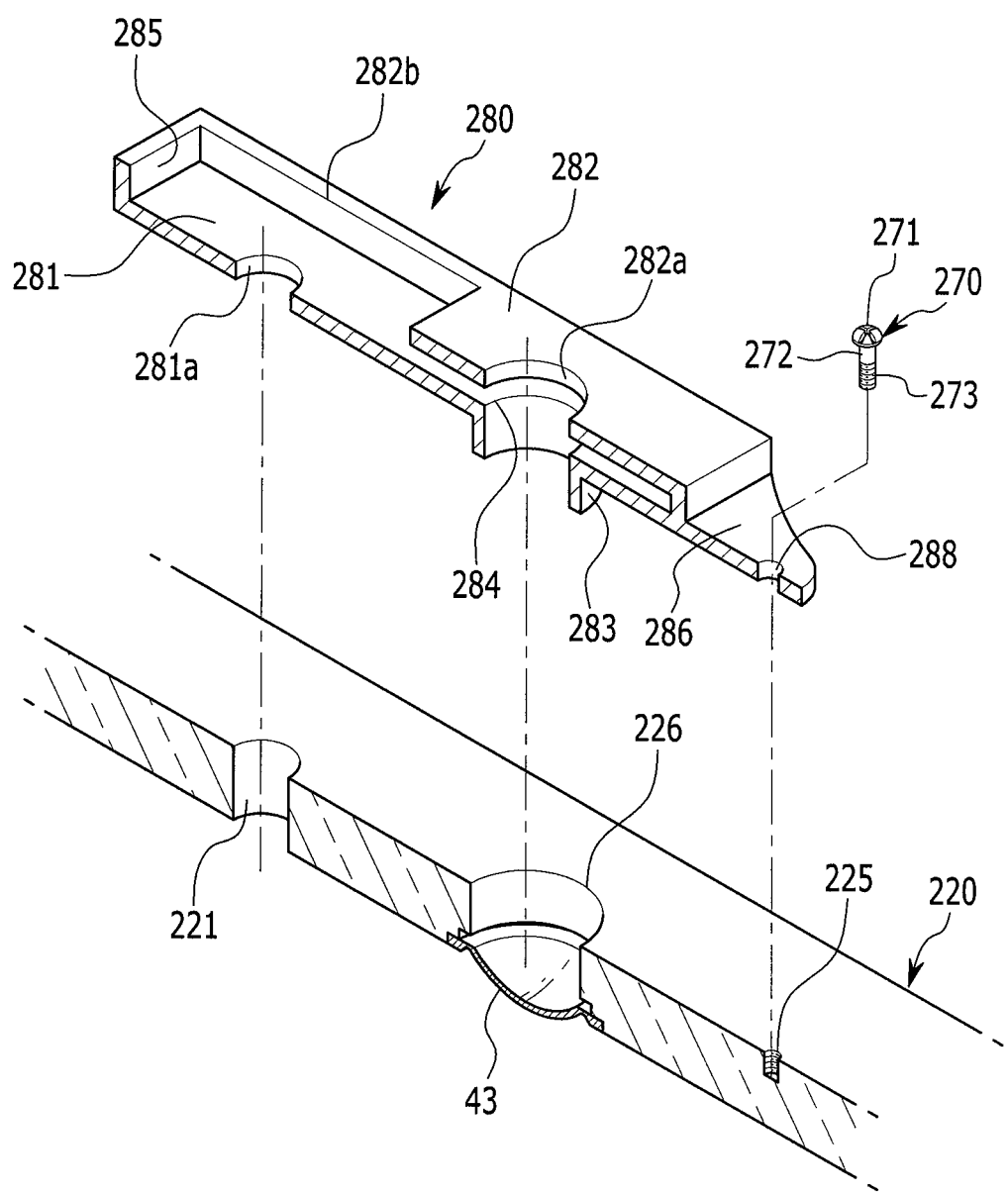
FIG. 9 is an exploded perspective view showing a cap plate and a top insulating member according to the second exemplary embodiment of the present invention.

FIG. 8 is a cross-sectional view showing a portion of a rechargeable battery according to a second exemplary embodiment of the present invention, and FIG. 9 is an exploded perspective view showing a cap plate and a top insulating member according to the second exemplary embodiment of the present invention.

Referring to FIGS. 8 and 9, since the rechargeable battery according to the present exemplary embodiment is constituted by the same structure as the rechargeable battery according to the first exemplary embodiment with the exception of a cap plate 220, a top insulating member 280, and a fixing member 270, an overlapping description of the same structure will be omitted.

The cap plate 220 is formed of a thin plate and is welded to the opening of the case 15 to seal the case 15. A terminal hole 221 into which the first electrode terminal 21 is inserted and a short-circuit hole 226 in which the membrane 43 is provided are formed in the cap plate 220. The rivet terminal 21a is provided to be inserted into the terminal hole 221. The membrane 43 electrically separating or connecting the cap plate 220 and the first electrode terminal 21 is provided in the short-circuit hole 226. In one embodiment, a thread groove 225 into which the fixing member 270 is inserted is formed in the cap plate 220. An internal surface of the thread groove 225 is threaded to form a screw thread.

The top insulating member 280 is provided between the connection plate 44 and the cap plate 220, and electrically insulates the cap plate 220 electrified by the positive electrode and the connection plate 44 electrified by the negative electrode on the cap plate 220.

The top insulating member 280 includes a bottom plate 281 contacting the cap plate 220, an upper plate 282 spaced from the bottom plate 281, and a side wall 285 connecting the bottom plate 281 and the upper plate 282.

The bottom plate 281 has a rectangular plate shape, and contacts the cap plate 220 on the cap plate 220. A terminal hole 281a into which the rivet terminal 21a is inserted and the first ventilation hole 284 located on the short-circuit hole 226 to communicate with the short-circuit hole 226 are formed in the bottom plate 281. Further, a guide rib 283 protruding downwardly to be inserted into the short-circuit hole 226 is formed at a circumference of the first ventilation hole 284. In one embodiment, a support flange 286 is formed at an end of a longitudinal side of the bottom plate 281. A fixing hole 288 through which the fixing member 270 is provided is formed in the support flange 286.

The upper plate 282 is spaced from the bottom plate 281 and faces the bottom plate 281. The connection plate 44 is inserted between the bottom plate 281 and the upper plate 282. An opening 282b into which the plate terminal 21c is inserted is formed in the upper plate 282, and is positioned at an upper portion of the terminal hole 281a. Further, a second ventilation hole 282a, into which the internal insulating member 81 and the stopper 90 are inserted, communicating with the first ventilation hole 284 is formed in the upper plate 282. The side wall 285 is formed to extend along the circumference of the bottom plate 281, and protrudes upwardly from the bottom plate 281 to connect the bottom plate 281 and the upper plate 282.

The fixing member 270 is a screw inserted into the thread groove 225, and includes a rod 272, a head unit 271 formed on an upper end of the rod 272, and a screw unit 273 as a threaded portion of the rod 272. A groove is formed in the head unit 271 to insert a tool therein. The head unit 271 is formed to have a transverse cross-section that is larger than that of the rod 272. The fixing member 270 is provided through the fixing hole 288 and screwed to the thread groove 225 to be fixed. When the fixing member 270 is fixed to the cap plate 220, an end of the top insulating member 280 may be prevented from being separated from the cap plate 220.

Figure 10:
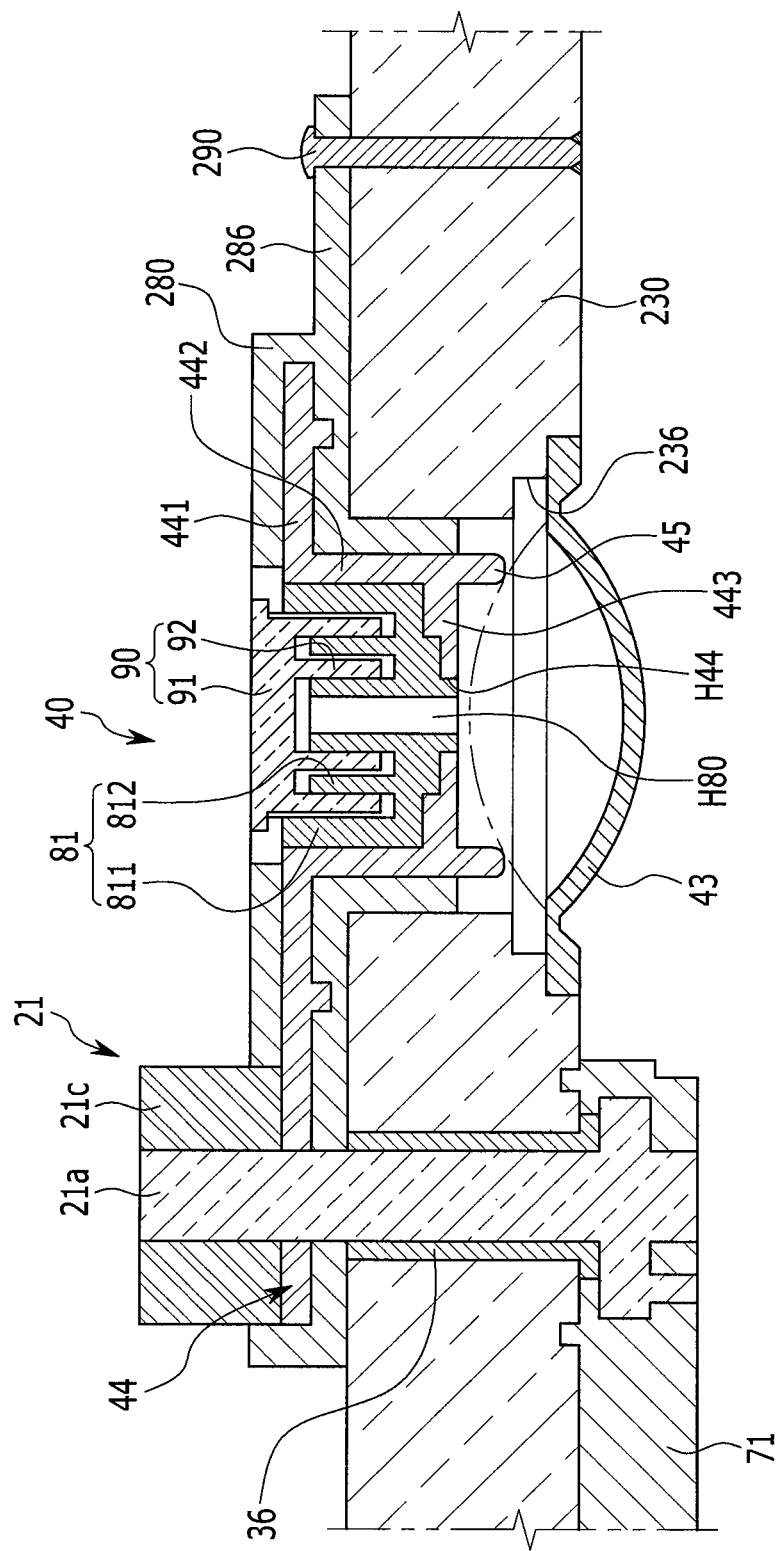
FIG. 10 is a cross-sectional view showing a portion of a rechargeable battery according to a third exemplary embodiment of the present invention.
Figure 11:
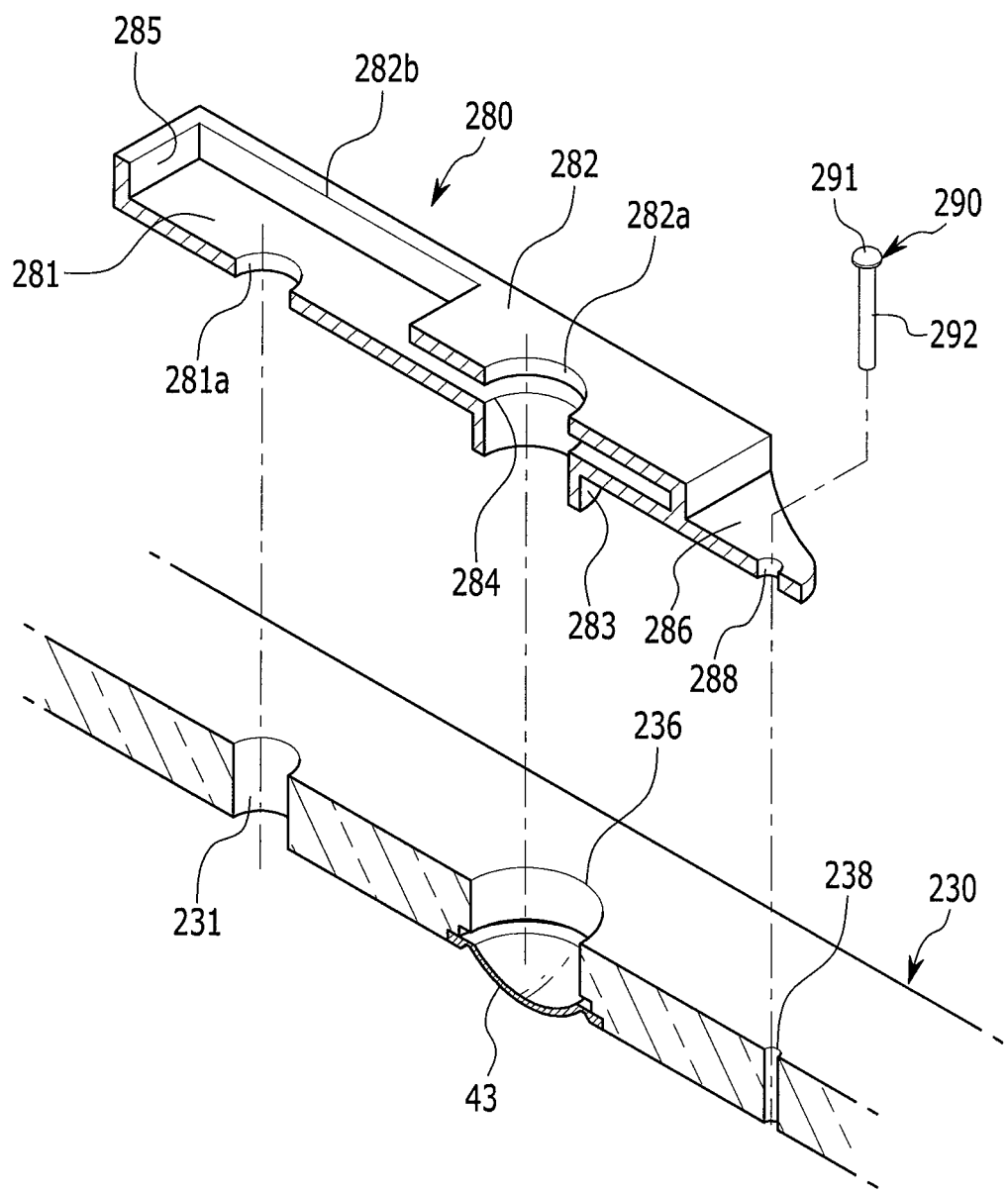
FIG. 11 is an exploded perspective view showing a cap plate and a top insulating member according to the third exemplary embodiment of the present invention.

FIG. 10 is a cross-sectional view showing a portion of a rechargeable battery according to a third exemplary embodiment of the present invention, and FIG. 11 is an exploded perspective view showing a cap plate and a top insulating member according to the third exemplary embodiment of the present invention.

Referring to FIGS. 10 and 11, since the rechargeable battery according to the present exemplary embodiment is substantially similar to the rechargeable battery according to the second exemplary embodiment with the exception of a cap plate 230 and a fixing member 290, an overlapping description of the same structure will be omitted.

The cap plate 230 is formed of a thin plate and is welded to the opening of the case 15 to seal the case 15. A terminal hole 231 into which the first electrode terminal 21 is inserted and a short-circuit hole 236 in which the membrane 43 is provided are formed in the cap plate 230. The rivet terminal 21a is provided to be inserted into the terminal hole 231. The membrane 43 electrically separating or connecting the cap plate 230 and the first electrode terminal 21 is provided in the short-circuit hole 236. In one embodiment, a support hole 238 into which the fixing member 290 is inserted is formed in the cap plate 230.

The fixing member 290 is provided through the fixing hole 288 and inserted into the support hole 238. The fixing member 290 includes a rod 292 and a head unit 291 formed on an upper end of the rod 292. The head unit 291 is formed to have a transverse cross-section that is larger than that of the rod 292. The fixing member 290 is provided to extend to a lower end of the support hole 238, and is fixed to a bottom surface of the cap plate 230 by welding.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims, the detailed description of the invention, and the drawings.

| Description of Symbols | |
|---|---|
| 101: rechargeable battery | 10: electrode assembly |
| 11: negative electrode | 12: positive electrode |
| 11a, 12a: coated region | 11b, 12b: uncoated region |
| 13: separator | 15: case |
| 20, 220, 230: cap plate | 201: electrolyte injection opening |
| 202: vent hole | 203: sealing stopper |
| 204: vent plate | 205: notch |
| 21: first electrode terminal | 22: second electrode terminal |
| 21a, 22a: rivet terminal | 21b, 22b: flange |
| 21c, 22c: plate terminal | 25, 270, 290: fixing member |
| 25a, 271, 291: head unit | 32: top plate |
| 40: external short-circuit unit | 42, 226, 236: short-circuit hole |
| 43: membrane | 44: connection plate |
| 441: plate unit | 442: cylinder unit |
| 443: bottom | 45: short-circuit protrusion |
| 81: internal insulating member | 811: first insertion unit |
| 812: first barrier | 813: receiving groove |
| 815: flange unit | 82, 280: upper insulating member |
| 821, 281: bottom plate | 821a, 281a: terminal hole |
| 822, 282: upper plate | 822a, 282a: second ventilation hole |
| 822b, 282b opening | 823, 283: guide rib |
| 824, 284: first ventilation hole | 825, 285: side wall |
| 826, 286: support flange | 827: step groove |
| 828, 288: fixing hole | 90: stopper |
| 91: cover | 92: second barrier |
| 221, 231: terminal hole | 272, 292: rod |
| 273: screw unit | |

What is claimed is:
1. A rechargeable battery comprising:
a case accommodating an electrode assembly;

a cap plate coupled to the case and having a short-circuit hole;

a first electrode terminal and a second electrode terminal extending through the cap plate and electrically connected to the electrode assembly;

a membrane fixed to the cap plate in the short-circuit hole;

a connection plate electrically connected to the first electrode terminal and spaced from a side of the membrane;

a top insulating member located between the connection plate and the cap plate; and a fixing member fixed to the cap plate and supporting the top insulating member, wherein the top insulating member includes a terminal hole, and the first electrode terminal is accommodated within the terminal hole, wherein the membrane is configured to directly contact the connection plate to thereby electrically connect the first electrode terminal and the second electrode terminal to cause a short circuit; and wherein a tube-shaped cylinder unit protruding toward the membrane is on an internal side of the connection plate, wherein an internal insulating member having an internal outlet is in the cylinder unit, and wherein a stopper is fitted into the internal insulating member.

2. The rechargeable battery of claim 1, wherein the fixing member includes a protrusion protruding from the cap plate.

3. The rechargeable battery of claim 2, wherein the fixing member includes a column unit and a head unit having a transverse cross-section that is larger than a transverse cross-section of the column unit.

4. The rechargeable battery of claim 1, wherein a thread groove is formed in the cap plate and the fixing member is screwed to the thread groove.

5. The rechargeable battery of claim 1, wherein the fixing member is fixed to the cap plate by welding.

6. The rechargeable battery of claim 1, wherein a protruding support flange is formed at an end of a longitudinal side of the top insulating member, and the fixing member extends through the support flange.

7. The rechargeable battery of claim 1, wherein the top insulating member includes a bottom plate contacting the cap plate, an upper plate Spaced from the bottom plate and facing the bottom plate, and a side wall connecting the bottom plate and the upper plate.

8. The rechargeable battery of claim 1, wherein the connection plate is in the top insulating member and wherein the top insulating member is formed by insert injection.

9. The rechargeable battery of claim 1, wherein the connection plate includes a plate unit connected to a first electrode terminal, and wherein the cylinder unit protrudes from the plate unit toward the membrane and is in a short-circuit hole spaced from an internal surface of the short-circuit hole.

10. The rechargeable battery of claim 9, wherein an internal insulating member includes a first insertion unit contacting an internal surface of the cylinder unit to provide an open upper side, and a first barrier spaced from an internal side of the first insertion unit in a radial direction of the first insertion unit to form a receiving groove between the first barrier and the first insertion unit.

11. The rechargeable battery of claim 10, wherein the stopper comprises:

a second barrier in an opening side of the first insertion unit and in the receiving groove, and a cover connected to a side of the second barrier to cover the first insertion unit.

12. The rechargeable battery of claim 11, comprising multiple first barriers to form a plurality of receiving grooves in the first insertion unit and multiple second barriers each formed to be in a respective one of the receiving grooves.

13. The rechargeable battery of claim 11, wherein:

a first interval is formed between an end of a first barrier and an internal surface of the cover, and a second interval is formed between an end of the second barrier and a bottom surface of the receiving groove.

14. The rechargeable battery of claim 11, wherein a first barrier and the second barrier are coupled at a first side thereof and a third interval is formed at a second side thereof.

15. The rechargeable battery of claim 14, wherein a top insulating member includes an upper outlet formed on at least one side of a cover to be connected to the third interval.

16. The rechargeable battery of claim 11, wherein the first insertion unit and a first barrier are formed in a concentric cylindrical form.

17. The rechargeable battery of claim 16, wherein the first insertion unit and a second barrier are formed in the concentric cylindrical form.

* * * * *